US010395389B2

(12) United States Patent
Pollard

(10) Patent No.: US 10,395,389 B2
(45) Date of Patent: Aug. 27, 2019

(54) CALIBRATION BASED ON INTRINSIC PARAMETER SELECTION AND A PROJECTED CALIBRATION TARGET

(71) Applicant: Hewlett-Packard Development Company, L.P., Fort Collins, CO (US)

(72) Inventor: Stephen Pollard, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 371 days.

(21) Appl. No.: 15/096,121

(22) Filed: Apr. 11, 2016

(65) Prior Publication Data
US 2017/0294009 A1  Oct. 12, 2017

(51) Int. Cl.
G06T 7/80 (2017.01)
H04N 17/00 (2006.01)

(52) U.S. Cl.
CPC ............. *G06T 7/80* (2017.01); *H04N 17/002* (2013.01)

(58) Field of Classification Search
CPC ..................................................... G06T 7/001
See application file for complete search history.

(56) References Cited

U.S. PATENT DOCUMENTS

| 6,256,099 | B1 | 7/2001 | Kaufman et al. |
| 7,433,029 | B1 | 10/2008 | Hsu |
| 8,311,366 | B2 | 11/2012 | Schiewe et al. |
| 8,704,895 | B2 | 4/2014 | Safaee-Rad et al. |
| 8,866,912 | B2 | 10/2014 | Mullis |

OTHER PUBLICATIONS

Anwar, H. et al.; "Projector Calibration for 3D Scanning Using Virtual Target Images"; Myongji University, Feb. 15, 2012; http://link.springer.com/article/10.1007%2Es12541-012-0017-3.

*Primary Examiner* — Y Lee
(74) *Attorney, Agent, or Firm* — HP Inc. Patent Department

(57) ABSTRACT

A computing system includes a projector, a camera, a calibration target, and a processor. The calibration target has known dimensions and four corners in a fixed position relative to both the projector and the camera. The processor causes the projector to project a calibration image having four corners and a repetitive pattern. The processor further causes the camera to capture a captured image of the calibration image and determine a rotation and translation that brings the four corners of the captured image into correspondence with the four corners of the calibration target and identify internal corner points of the repetitive pattern. The processor further selects an intrinsic parameter value and calibrates a 3D coordinate system of at least one of the camera and the projector to the calibration target using the selected intrinsic parameter value, the rotation and translation, and the internal corner points.

14 Claims, 3 Drawing Sheets

CALIBRATION BASED ON INTRINSIC PARAMETER SELECTION AND A PROJECTED CALIBRATION TARGET

BACKGROUND

A device, such as a device including a camera and a projector, may be calibrated to allow more accurate capture of 3D data. For example, structured light patterns may be projected by the projector onto an object and may be identified in the camera images and triangulated, based on the calibrated parameters of the camera and projector, in order to determine the depth of individual points on the object's surface. A series of such image captures may be used to create a complete 3D description of the object's surface. Calibrating the camera and/or projector may involve determining extrinsic parameters associated with the device that indicate its position in relation to a global frame of reference.

BRIEF DESCRIPTION OF THE DRAWINGS

The drawings describe example embodiments. The following detailed description references the drawings, wherein.

DETAILED DESCRIPTION

Figure 1:
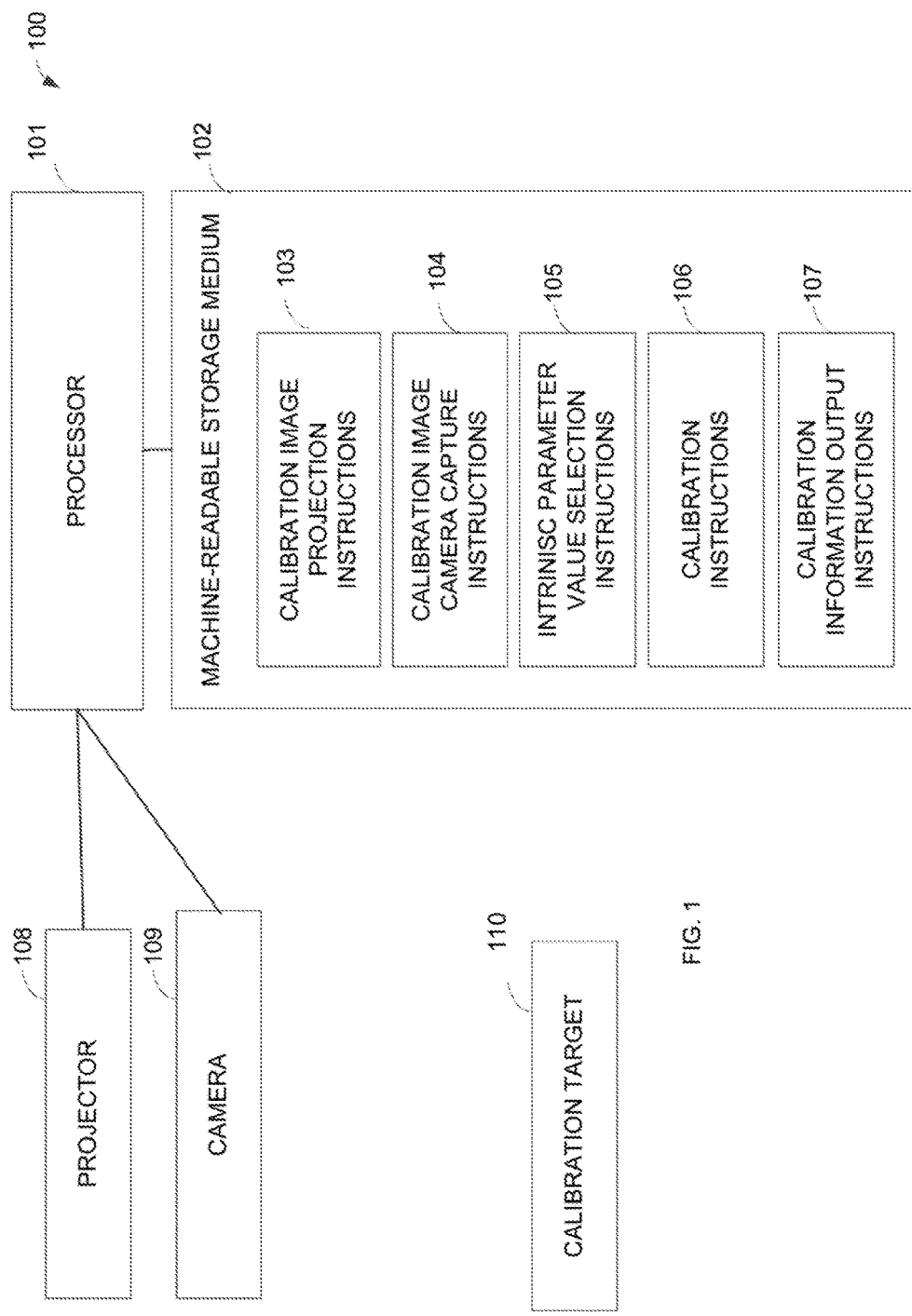
FIG. 1 is a block diagram illustrating one example of a computing system to calibrate a device based on intrinsic parameter selection and a projected calibration target.

In one implementation, calibrating a camera and projector system to determine their positions with respect to a common 3D coordinate system involves an automated intrinsic parameter selection process and a projected calibration image onto a calibration target. A processor may create 3D calibration information for a device, such as a projector and/or camera, based on a set of intrinsic calibration parameter value options, a calibration target of known dimensions, and a virtual calibration target created based on a projection onto the calibration target. Creating the 3D calibration information may involve selecting at least one of the calibration parameter value options, and the 3D calibration information may be created using the selected calibration parameter value. For example, a camera may be calibrated such that the position of the camera with respect to the 3D frame of reference, related to the physical calibration target, allow an image captured by the camera to align with the projection of the virtual calibration target. Similarly, a projector may be calibrated such that an image projected by a projector aligns with the virtual calibration target.

Calibrating a device may allow for user input and/or 3D scan information captured from the calibrated device to be more accurately interpreted. Stored information related to the relative intrinsic and extrinsic parameters of the camera and projector may improve the triangulation accuracy of the recovered 3D data for a 3D scanned object. Furthermore, the data as recovered may be in a known frame of reference defined by the calibration target. A calibration method involving a projected calibration image may be beneficial in a home calibration setting. For example, a device may be calibrated in a factory setting, but in some cases, the factory calibrated settings may no longer be accurate when received by a customer, such as due to thermal or mechanical shock during the shipping process. Using a projected image onto a calibration target may allow for more flexibility of the appearance of the physical calibration target and may allow an item, such as an input device or other part of a computing system, to serve a dual purpose as a functional device and as a calibration target. For example, a computing system may include a camera, projector, and touch pad, and the touch pad may also serve as a calibration target when a calibration image is projected by the projector onto the touch pad.

Calibration may involve a set of intrinsic parameter value inputs, such as focal length or radial distortion, to be used to determine the extrinsic parameters indicating the position of the device relative to an external frame of reference. In one implementation, a processor selects an intrinsic parameter value to use for the calibration based on a comparison of a calibration target of known dimensions to an image of the calibration target with a projected image. For example, the processor may receive a set of intrinsic parameter values from a storage or via a network, and the processor may test the set of intrinsic parameter values to select an intrinsic parameter value to use for calibration. A method to select an intrinsic parameter value may allow for a set of generic or random intrinsic parameter values to be used such that the intrinsic parameters associated with the particular device are not determined and/or stored. Selecting a more accurate intrinsic parameter value from the set of generic or random options to use for calibration may produce a better calibration result.

FIG. 1 is a block diagram illustrating one example of a computing system to calibrate a device based on intrinsic parameter selection and a projected calibration target. For example, the computing system 100 includes a projector 108 and a camera 109. In one implementation, the projector 108 projects an image such that a user may interact with the projected image, and the user input information is captured via camera 109. The computing system 100 may calibrate the projector 108 and/or camera 109 using a calibration target 110 by executing instructions stored in a machine-readable storage medium 102.

The projector 108 may be any suitable type of projector that projects an image. The projector 108 may project an image onto an input device such that a user may interact with the computing device 100 using the input device and information projected onto the input device by the projector 108. For example, the user may provide touch or gesture input in relation to the projected image. The projector 108 may project a pattern onto an object such that an image of the object with the projection is used to 3D scan the object. In one implementation, the projector 108 is positioned to project an image onto the calibration target 110.

The camera 109 may be any suitable camera for capturing images related to the computing system 100. For example, the camera 109 may capture user interaction information associated with the computing device 100, such as gestures or touch input. In one implementation, the camera 109 captures an image of user interaction in relation to a projection by the projector 108. The camera 109 may capture an image of an object such that the image is used to recover 3D information related to the object.

In one implementation, the camera 109 and projector 108 may be used to scan a 3D object by projecting by the projector 108 known patterns onto the object and interpreting, such as by the processor 101, images captured by the camera 109 to find correspondences with known pattern components. Using relative intrinsic and extrinsic calibration information associated with the projector 108 and the camera 109, the processor 101 may triangulate surface locations of the object to form a complete 3D description of the object aligned with the common frame of reference of the system.

The calibration target 110 may be any suitable calibration target. The calibration target 110 may be of known dimensions and in a fixed position in relation to the computing system 100. The calibration target 110 may be any suitable shape and size. In one implementation, calibration target 110 is a flat rectangular calibration target. The calibration target 110 may be an input device, such as a touch pad, for providing user input to the computing system 100. For example, the calibration target 110 may be designed to receive user input that may be captured by the calibration target 110 and/or the camera 108.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include calibration image projection instructions 103, calibration image camera capture instructions 104, intrinsic parameter value selection instructions 105, calibration instructions 106, and calibration information output instructions 107.

The calibration image projection instructions 103 may include instructions to cause the projector 108 to project an image onto the calibration target 110. The projected image may be an image to be used to calibrate the projector 108 and/or camera 109. The projector 108 may project any suitable image for calibration. For example, the projector 108 may project a pattern onto the calibration target 110 such that the pattern may be used to determine information about the location of portions of the pattern in relation to the calibration target 110. The calibration pattern may be any suitable pattern, such as a rectangular pattern. The pattern may be a checkered or other pattern with sections of the same size. The pattern may include indicia to indicate the center of the pattern, such as a particular image item or based on equal sized objects across the pattern. In one implementation, the projector 108 projects multiple calibration images. For example, the projector 108 may project a first pattern image and a second image of uniform brightness, such as where the image of uniform brightness is used to locate the total projection area of the projector 108.

The calibration image camera capture instructions 104 may include instructions to cause the camera 109 to capture an image of the calibration target 110 with the projected image on the calibration target 110. The camera 109 may be positioned such that the calibration target 110 is within the camera 109 view. For example, the calibration target 110 may be in a fixed position in view of the camera 109. The camera 109 may capture an image while the projector 108 projects an image onto the calibration target 110. The captured image may be used as a calibration image to calibrate the projector 108 and/or camera 109. For example, the same method may be used to calibrate both the projector 108 and the camera 109, or a different method may be used to calibrate each.

The intrinsic parameter value selection instructions 105 may include instructions to select an intrinsic parameter value from a set of intrinsic parameter values based on a comparison of the effect of each of the intrinsic parameter values in the set applied to information related to the calibration target and captured image of the calibration target. The intrinsic parameter may be any suitable intrinsic parameter indicating an internal setting associated with the device. For example, to calibrate the projector 108, the intrinsic parameter may include projector center of projection, projector focal length, projector aspect ratio, and/or projector radial distortion. As another example, to calibrate the camera 109, the intrinsic parameter may include camera focal length, camera aspect ratio, camera radial distortion, and/or camera center of projection.

The set of intrinsic parameter values may be accessed from a storage and/or may be received via a network. The intrinsic parameter values may include any suitable values, such as intrinsic parameter values associated with other computing systems of the same type as the computing system 100. For example, factory calibrations across individual computing systems of the same type may be used as a set of intrinsic parameter value options. In one implementation, the set of intrinsic parameter values options is selected by the processor 101 or by another processor. For example, a subset of possible intrinsic parameter values may be selected and tested. The subset may be selected, for example, based on calibration accuracy for other computing systems similar to the computing system 100.

The calibration instructions 106 may include instructions to calibrate a 3D coordinate system of the camera 109 and/or projector 108 using the selected intrinsic parameter value. For example, determining the calibration information may include determining location with respect to a global frame of reference, such as a position on the calibration target 110, and pixel information associated with the camera view 109 and/or projector 108 projection. The calibration information may be determined based on a set of intrinsic parameter values, such as an array including an intrinsic parameter value for each entry in the array. The selected intrinsic parameter value may be included as the array value related to the particular intrinsic parameter. In one implementation, an intrinsic parameter value is selected for multiple intrinsic parameters such that the set of selections is used to calibrate the camera 109 and/or projector 108.

The calibration output instructions 107 may include instructions to output information related to the device intrinsic and extrinsic parameters defined with respect to a 3D coordinate system. For example, the information may be stored, transmitted, and/or displayed. In one implementation, the intrinsic and extrinsic parameters are stored, and the computing system 100 uses the stored information to interpret information from the projector 108 and camera 109 to recover 3D scan data relative to the calibration target 110.

Figure 2:
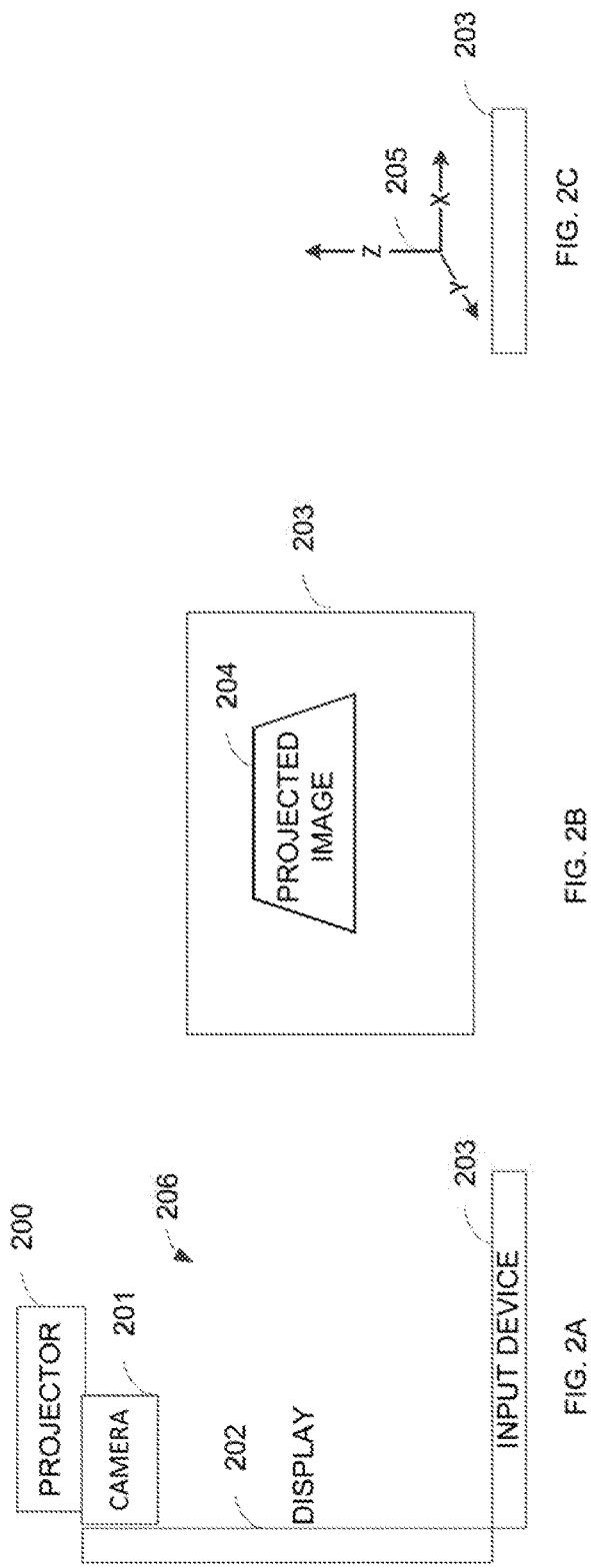
FIGS. 2A-2C are diagrams illustrating examples of calibrating a device based on intrinsic parameter selection and a projected calibration target.

FIGS. 2A-2C are diagrams illustrating examples of calibrating a device based on intrinsic parameter selection and a projected calibration target. FIG. 2A is a diagram illustrating one example of a computing system 206 that may be calibrated. The computing system 206 in FIG. 2A includes a display 202, a camera 201, a projector 202, and an input device 203. In one implementation, the display 202 displays information, and the projector 202 projects additional information, such as onto the input device 203. The input device 203 may serve as both an input device and as a projection screen. The input device 203 may be, for example, a touch pad. The camera 201 may capture an image of user interaction in relation to the display 202, projected image, and/or input device 203. In one implementation, the input device 203 is used as a calibration target to calibrate the projector 202 and/or camera 201. The input device 203 may be of known dimensions and may be a rectangular, flat surface. The input device 203 may be in a fixed position within the computing system, such as where it is attached to the display 202 or other component of the computing system.

FIG. 2B shows an example of the input device 203 with a projected image 204 projected onto the input device 203. The projected image 204 may be any suitable image used to calibrate the projector 202 and/or camera 201. The projected image 204 may be a rectangular image. In one implementation, the projected image 204 is a checkered image with rectangles or other known repetitive pattern. The projector 202 may project multiple calibration images onto the input device 203, such as where a first projected image includes a pattern and a second projected image is of uniform brightness. A processor may compare the four corners of the input device 203, or a portion of the input device 203, to the four corners of the projected image 204, or a portion of the projected image 204. In one implementation, the input device 203 is a non-rectangular shape but has a rectangular portion, such as of a different color. The processor may compare information about the input device 203 to information from an image by the camera 201 of the projected image 204. The comparison may be performed using a first intrinsic parameter value and then using a second intrinsic parameter value FIG. 2C is a diagram illustrating a 3D coordinate system 205 created in relation to the input device 203. For example, the 3D coordinate system 205 may be created relative to the input device 203 such that the x and y axis are along the top surface of the input device 203, and the z-axis is a vertical axis from the center of the top surface of the input device 203. The 3D coordinate system may be used to represent the position of the camera 201 and/or projector 202 such that 3D scan data can be generated relative to the real world coordinate system in relation to the physical input device 203.

Figure 3:
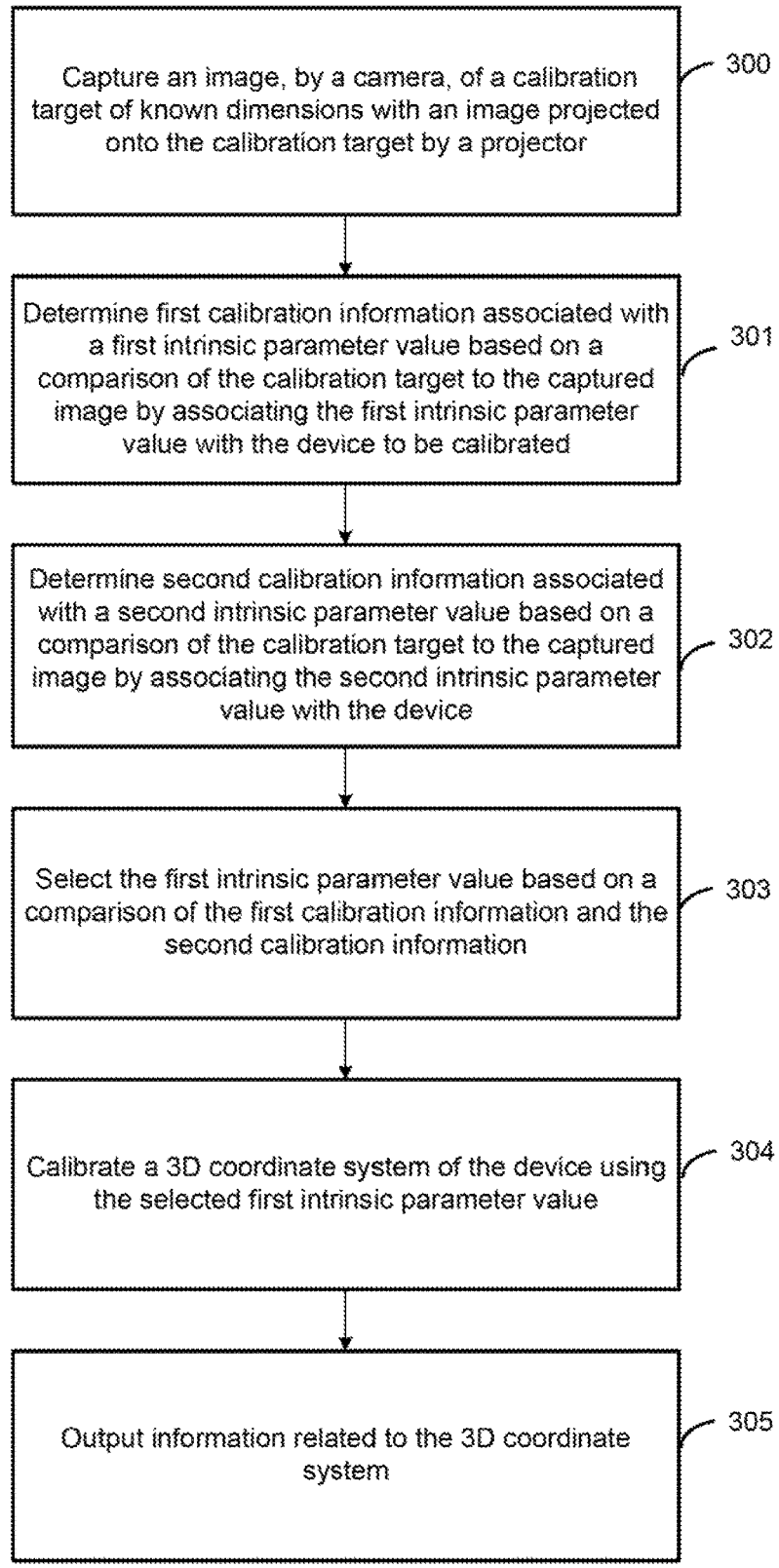
FIG. 3 is a flow chart illustrating one example of a method to calibrate a device based on intrinsic parameter selection and a projected calibration target.

FIG. 3 is a flow chart illustrating one example of a method to calibrate a device based on intrinsic parameter selection and a projected calibration target. For example, calibrating a device may involve determining a set of extrinsic parameters associated with a device such that the position of the device may be represented with respect to an external frame of reference. Intrinsic parameter information associated with the device, such as a camera and/or projector, may be accounted for when determining the extrinsic parameters in order to prevent distorting the extrinsic parameter values and to improve the quality of the calibration itself. In one implementation, a processor selects an intrinsic parameter value from a set of intrinsic parameter values to use for calibration. For example, the set of intrinsic parameter values may be associated with other devices in a similar computing system that may approximate the actual intrinsic parameter value of the device. The device may be part of a computing system including a physical calibration target of known dimensions and/or known position in relation to the device. A processor may select an intrinsic parameter value based on a comparison between the physical calibration target and/or virtual calibration target and an image of the calibration target. The device may be calibrated using the selected intrinsic parameter value. The method may be performed, for example, by the computing system 100 of FIG. 1 and may be used to calibrate a camera and/or projector associated with the computing system.

Beginning at 300, a camera captures an image of a calibration target of known dimensions with an image projected onto the calibration target by a projector. The camera may be any suitable camera, such as a camera for capturing images of user interactions with respect to a computing device and/or with respect to projected images associated with the computing device.

The projector may be any suitable projector for projecting an image that may be captured by the camera. For example, the projector and camera may be part of the same computing device such that a projector projects an image that a user may interact with using touch or gesture input, and the camera may capture information about the interaction. In one implementation, the projector and camera are part of a computing system used for 3D capture, such that the projector projects a pattern onto an object, and the camera captures an image of the object with the projected pattern onto it. A processor associated with the computing system may interpret the captured image to 3D scan the object.

The calibration target may be any suitable calibration target. The calibration target may be an item or a portion of an item, such as where a portion of an item of a different color or texture serves as the calibration target. The calibration target may be a part of the computing system associated with the camera and projector. For example, the calibration target may be an input device, such as a touch pad. The calibration target may be in a fixed position in a computing system relative to the camera and/or projector. The calibration target may be of known dimensions, such as where the dimensions of the calibration target are stored and accessed by the processor performing the calibration. The calibration target may be any suitable shape and elevation. In one implementation, the calibration target is a flat, rectangular surface.

The projector may project any suitable calibration image onto the calibration target. The projector may project a patter such that the location of portions of the pattern as projected onto the calibration target may be used to locate the position and orientation of the projector and/or camera with respect to a real world coordinate frame defined by the calibration target. The projector may project multiple images onto the calibration target such that the different projections are used for different calibration purposes. In one implementation, the projector projects one image of uniform brightness used to determine the projection area and projects a second image including a pattern used to provide location information relative to the calibration target.

The processor may apply image analysis techniques to determine information about the projected calibration image. For example, the processor may identify the projected image using edge fitting, linking, and/or line fitting methods. In one implementation, the projector projects an image of uniform brightness, and the processor uses image analysis methods to identify the four corners of the physical calibration target and the four corners of the projected calibration target from an image captured by the camera of the calibration target with the projected image. In one implementation, the projector projects a repetitive pattern, such as a checker pattern, and the processor uses image analysis methods to identify the internal corner points of the projected calibration target from an image by the camera of the calibration target with the projected image.

Continuing to 301, a processor determines first calibration information associated with a first intrinsic parameter value based on a comparison of the calibration target to the captured image by associating the first intrinsic parameter value with the device to be calibrated, such as the camera and/or projector. Device calibration may be based on a set of intrinsic parameters associated with the device, and the first calibration information may be determined based on a first option for a value of an intrinsic parameter. In one implementation, the first calibration information is associated with a set of intrinsic parameter values where each value in the set is associated with a different parameter.

The intrinsic parameter may be any suitable intrinsic parameter. For example, for camera calibration the intrinsic parameter may be camera focal length, camera aspect ratio, camera radial distortion, camera center of camera, and for projector calibration the intrinsic parameter may be projector center of projection, projector focal length, projector aspect ratio, and projector radial distortion.

The first intrinsic parameter value may be any suitable value. In one implementation, the first intrinsic parameter value is associated with a factory determined intrinsic parameter value of another computing system of the same or similar product. The processor may access the first intrinsic parameter value via storage or network.

The processor may compare information related to the calibration to the captured image of the calibrated target with the projected image in any suitable manner. For example, the processor may create a transformation between the real world coordinates of the physical calibration target, based on the stored dimensions of the calibration target, and the respective location in the device, such as the location in the camera image and/or the projector space. In one implementation, the projected calibration target is a rectangular pattern, and the processor determines a rotation and translation of the camera and/or projector with respect to the known physical calibration target that brings the projection of the four corners of the projected calibration target into correspondence with their device locations. For example, a transformation may be created with 6 parameters, such as 3 related to rotation and 3 related to translation. The parameters related to rotation may be, for example, pan, roll, and tilt. The transformation may be determined in any suitable manner, such as using an image processing function. For the projector, the device locations in the projector space may be determined using the identified image locations of the four corners of the uniform projected calibration target and the four corners of the physical calibration target.

In one implementation, virtual calibration targets may be generated based on a homography created between the four corners of the image of the calibration target and the known real world information associated with the calibration target. The homography may be created using the first intrinsic parameter value. For example, the homography may depend on the intrinsic parameters of the camera, such as to account for radial distortion and other factors. For example, a processor may create a homography between the calibration target and an image of the calibration target in the camera. The homography may be used to synthesize some virtual calibration points based on point locations identified in an image of the projected calibration target. The homography may be determined in any suitable manner, such as using an image processing function associated with a software library. The virtual calibration target may be used instead of or in addition to the physical calibration target with the projected image to create a transformation between the virtual calibration target and the image of the calibration target in the camera and/or projector.

In one implementation, a virtual calibration target may be constructed for the projector that corresponds to the physical extent of the projected area. In this case, the transformation, including the rotation and translation, of the projector are determined, with respect to the known physical calibration target, such that the rotation and translation bring the projection of the four corners of the virtual calibration target into correspondence with the four corners that define the physical extent of the projector space.

In one implementation, the virtual calibration target may be extended to include additional points that correspond to the internal corner points of the projected checker pattern. In this case, the rotation and translation of the projector and/or camera are determined, with respect to the known physical calibration target, such that the rotation and translation bring the projection of locations in the virtual calibration target into correspondence with the their respective locations in the camera image and/or the projector space.

The first calibration information may indicate the result of the comparison. For example, the first calibration information may indicate a residual error resulting from the comparison of the projection of the known calibration target information (real or virtual) to the captured image of the calibration target.

Continuing to 302, a processor determines second calibration information associated with a second intrinsic parameter value based on a comparison of the calibration target to the captured image by associating the second intrinsic parameter value with the device. The second intrinsic parameter value may be a second option for the value of the intrinsic parameter. The second intrinsic parameter value may be, for example, related to another calibration of a different device of the same product line. In one implementation, calibration information across many devices is compared such that the first and second intrinsic parameter value are selected as part of a subset to test due to a likelihood of providing more accurate calibration information. The second intrinsic parameter value may be a second value option associated with the same parameter type. For example, in the case of calibrating the projector, the first and second intrinsic parameter value may be related to projector radial distortion, and in the case of calibrating the camera, the first and second intrinsic parameter value may be related to camera radial distortion.

The second calibration information may be determined similar to the first calibration information applied to a different calibration parameter value. The second calibration information may indicate a result of comparing information about the calibration target to the image of the calibration target with the projected image with the second intrinsic parameter value used to account for device information. For example, the second calibration information may indicate a residual error from the comparison of the projection of the known calibration target information to the captured image of the calibration target.

Continuing to 303, a processor selects the first intrinsic parameter value based on a comparison of the first calibration information and the second calibration information. For example, the first and second calibration information may indicate a residual re-projection error, and the first calibration information may be selected due to having a lower value than the second calibration information.

Continuing to 304, a processor calibrates a 3D coordinate system of the device using the selected first intrinsic parameter value. The processor may calibrate the device by determining the extrinsic parameters of the device, taking into account intrinsic parameter values related to the operation of the device. As an example, the processor may use a set of intrinsic parameter values where each entry includes a value for a different intrinsic parameter. The processor may use the selected first intrinsic parameter value for an intrinsic parameter associated with the first intrinsic parameter value. The calibration may involve creating a 3D coordinate transformation system to associate the location of the calibrated device with the calibration target, which may be, for example, an input device. The 3D coordinate system may include a vertical z-axis from the center of the calibration target and a horizontal x-axis and horizontal y-axis along the surface of the calibration target.

In one implementation, the processor creates multiple calibrations based on different intrinsic parameter value options and selects a calibration based on a comparison to statistics associated with other calibrations, such as factory calibrations. For example, the distribution of relative position of the camera and the projector may be compared to a standard deviation from a mean value of the factory distribution.

Continuing to 305, a processor outputs information related to the 3D coordinate system. For example, the processor may store, transmit, or display information related to the 3D coordinate system. In one implementation, the processor stores information about the 3D coordinate system such that the stored information is used to identify the relative position and orientation of the calibrated camera and/or projector. The calibrated computing system may be used to more accurately interpret input information relative to the calibration target, such as to interpret 3D scan data based on structured light patterns projected by the projector and captured by the camera.

The invention claimed is:

1. A computing system, comprising:
   a projector;
   a camera;
   a calibration target of known dimensions defining a real world coordinate frame and having four corners, wherein the projector and the camera are in a fixed position relative to the calibration target; and
   a processor to:
      cause the projector to project an image of uniform brightness, wherein the image of uniform brightness is to determine a projection area;
      cause the camera to capture a first captured image of the image of uniform brightness;
      cause the projector to project a calibration image having four corners and a repetitive pattern to provide location information in the real world coordinate frame of one of the projector and the camera relative to the calibration target onto the calibration target;
      cause the camera to capture a second captured image of the calibration image;
      determine a rotation and translation that brings the four corners of the second captured image into correspondence with the four corners of the calibration target;
      identify internal corner points of the repetitive pattern in the captured image;
      select an intrinsic parameter value from a set of intrinsic parameter values based on a comparison of the effect of each of the intrinsic parameter values in the set applied to information related to the calibration target, the first captured image, and the second captured image;
      calibrate a 3D coordinate system of at least one of the camera and the projector to the real world coordinate frame of the calibration target using the selected intrinsic parameter value, the rotation and translation, and the internal corner points, wherein the 3D coordinate system is associated with the calibration target, wherein the 3D coordinate system comprises a vertical z-axis from the center of the calibration target, and a horizontal x-axis and horizontal y-axis along the surface of the calibration target; and
      output information related to the 3D coordinate system.

2. The computing system of claim 1, wherein the calibration target comprises an input device.

3. The computing system of claim 1, wherein the calibration target comprises a flat and rectangular calibration target.

4. The computing system of claim 1, wherein the processor is further to receive information about the set of intrinsic parameter values from at least one of a network and a storage and wherein the set of intrinsic parameter values are related to a calibration of a separate device.

5. The computing system of claim 1, wherein the intrinsic parameter comprises at least one of: camera focal length, camera aspect ratio, camera radial distortion, camera center of camera, projector center of projection, projector focal length, projector aspect ratio, and projector radial distortion.

6. The computing system of claim 1, wherein causing the projector to project a calibration image comprises causing the projector to project a first image including a pattern with the repetitive pattern of the calibration image and to project a second image of uniform brightness with the four corners of the calibration image.

7. A method, comprising:
   capturing a first captured image and a second captured image, by a camera, of a calibration target of known dimensions defining a real world coordinate frame and having four corners, wherein a projector and a camera are in a fixed position relative to the calibration target, wherein the projector is to project an image of uniform brightness to determine a projection area and a calibration image having four corners and a repetitive pattern onto the calibration target to provide location information in the real world coordinate frame of one of the projector and the camera relative to the calibration target, wherein the first captured image is of the image of uniform brightness and the second captured image is of the calibration image;
   determining a rotation and translation that brings the four corners of the second captured image into correspondence with the four corners of the calibration target;
   identifying the internal corner points of the repetitive pattern in the second captured image;
   determining first calibration information associated with a first intrinsic parameter value based on a comparison of the calibration target to the first captured image and the second captured image by associating the first intrinsic parameter value with a device comprising at least one of the camera and the projector;
   determining second calibration information associated with a second intrinsic parameter value based on a comparison of the calibration target to the second captured image by associating the second intrinsic parameter value with the device;
   selecting the first intrinsic parameter value based on a comparison of the first calibration information and the second calibration information;

calibrating a 3D coordinate system of the device to the real world coordinate frame of the calibration target using the selected first intrinsic parameter value, the rotation and translation, and the internal corner points, wherein the 3D coordinate system is associated with the calibration target, wherein the 3D coordinate system comprises a vertical z-axis from the center of the calibration target, and a horizontal x-axis and horizontal y-axis along the surface of the calibration target; and outputting information related to the 3D coordinate system.

8. The method of claim 7, wherein the set of intrinsic parameter values comprises intrinsic parameter values associated with a factory calibration of another device.

9. The method of claim 7, wherein the calibration target comprises an input device.

10. The method of claim 7, wherein determining the first calibration information comprises determining a residual error associated with the first calibration parameter value.

11. A computer readable non-transitory storage medium comprising instructions executable by a processor to:
create 3D calibration information for a device, comprising at least one of a projector and a camera that are in a fixed position relative to a calibration target, based on a set of intrinsic calibration parameter value options, the calibration target that comprises known dimensions that define a real world coordinate frame and four corners in a fixed position relative to both the projector and the camera, and a first captured image and a second captured image captured by the camera, wherein the first captured image is of an image of uniform brightness projected by the projector and the second captured is of a calibration image projected by the projector, wherein the calibration image has four corners and a repetitive pattern to provide location information in the real world coordinate frame of one of the projector and the camera relative to the calibration target onto the calibration target, wherein creating 3D calibration information comprises instructions to associate the 3D coordinate system with the calibration target, wherein the 3D coordinate system comprises a vertical z-axis from the center of the calibration target, and a horizontal x-axis and horizontal y-axis along the surface of the calibration target;

determine a rotation and translation that brings the four corners of the second captured image into correspondence with the four corners of the calibration target; and identify the internal corner points of the repetitive pattern in the second captured image, wherein creating the 3D calibration information comprises instructions to:
select at least one of the set of intrinsic calibration parameter value options based on a result of a comparison of the calibration target to the first captured image and the second captured image; and
calibrate a 3D coordinate system of at least one of the camera and the projector to the real world coordinate frame of the calibration target based on the selected intrinsic calibration parameter value, the rotation and translation, and the internal corner points.

12. The computer readable non-transitory storage medium of claim 11, wherein the calibration target comprises an input device associated with a computing system including the projector and the camera.

13. The computer readable non-transitory storage medium of claim 11, further comprising instructions to select at least one of the calibration intrinsic parameter value options based on a residual error associated with the intrinsic parameter value.

14. The computer readable non-transitory storage medium of claim 11, wherein the intrinsic parameter value options comprise intrinsic parameter values associated with other devices.

* * * * *

UNITED STATES PATENT AND TRADEMARK OFFICE
CERTIFICATE OF CORRECTION

| | |
|---|---|
| PATENT NO. | : 10,395,389 B2 |
| APPLICATION NO. | : 15/096121 |
| DATED | : August 27, 2019 |
| INVENTOR(S) | : Stephen Pollard |

Page 1 of 1

It is certified that error appears in the above-identified patent and that said Letters Patent is hereby corrected as shown below:

In the Drawings

In sheet 1 of 3, FIG. 1, reference numeral 105, Line 1, delete "INTRINISC" and insert -- INTRINSIC --, therefor.

Signed and Sealed this
Thirty-first Day of December, 2019

Andrei Iancu
*Director of the United States Patent and Trademark Office*